E. Jenney,
Making Staves.
Nº 7,380. Patented May 21, 1850.
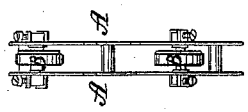
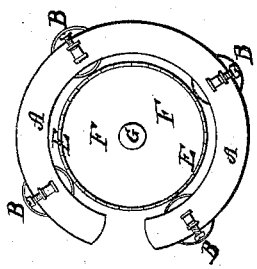
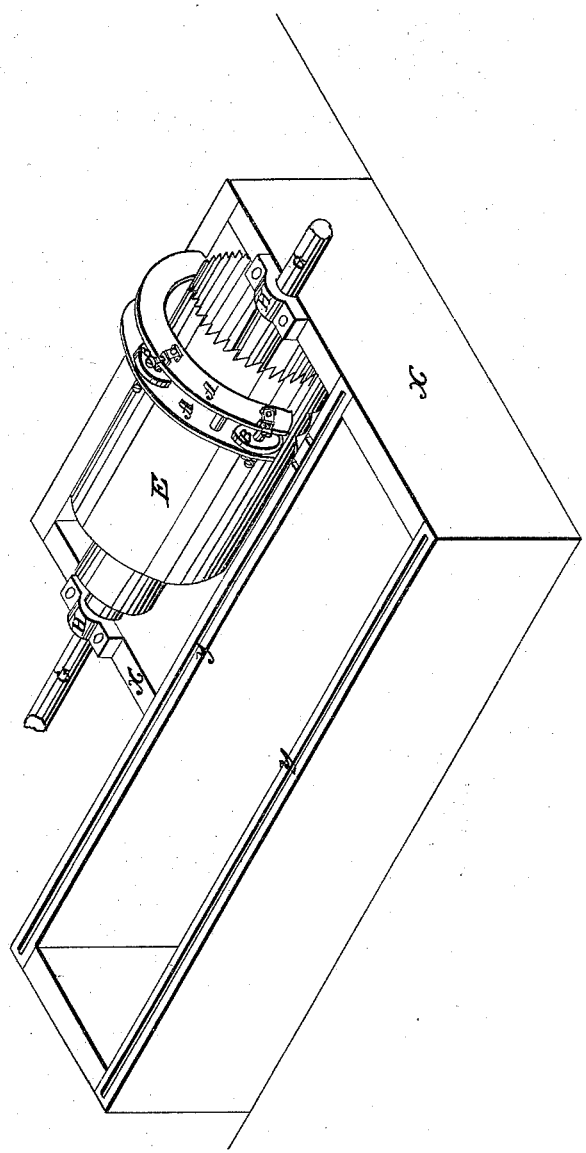

UNITED STATES PATENT OFFICE.

EDWIN JENNEY, OF NEW BEDFORD, MASSACHUSETTS.

MACHINERY FOR SAWING STAVES.

Specification of Letters Patent No. 7,380, dated May 21, 1850.

*To all whom it may concern:*

Be it known that I, EDWIN JENNEY, of New Bedford, in the county of Bristol and State of Massachusetts, have invented new and useful Improvements in Machinery for Sawing Staves, and that the following is a full, clear, and exact description of the same, reference being had to the accompanying drawing, making a part of this specification, in which—

Figure 1, is an isometrical projection of the machine; Fig. 2, is a front view of the saw and pulleys for steadying it; Fig. 3, is a side elevation of the roller for steadying the saw.

Cylindrical or bent saws, have heretofore been made for the purpose of sawing staves, but from various causes they have not been brought into use. One plan has been to place the band which forms the saw over a number of friction rollers, situated on a circle, and inside of the saw; but this method has been abandoned, as the saw cannot be strained by it into a true circle. And another plan has been to attach the end of the cylinder opposite that on which the teeth are situated, firmly to a disk, affixed to the end of a shaft on which it turns; but this mode of construction is found to be unsteady and inefficient in practice, as the length of the cylinder must be equal to the length of the stave to be sawed, a long cylinder unsupported, at its serrated end, being liable to great vibration, and unsteadiness in its operation.

By my improved apparatus I am enabled to overcome these various objections. It is constructed in the following manner. A shaft G, is supported at each end in proper bearings in the frame X, one of which is seen at H, Fig. 1. Near one end of this shaft, there is a disk or wheel E, Fig. 2, to which a long cylinder of sheet metal or saw plate E, is attached by one end, the other end being serrated, and projecting over the shaft, as clearly represented in Fig. 1. Near this end of the cylinder, two curved pieces A, surround about two thirds of it, more or less. These curved pieces are affixed to the frame X, and between them are suspended a number of friction rollers B, that bear upon the outer surface of the cylinder, at various points, as clearly shown in Fig. 2, by which the cylinder can obviously be kept steady, and prevented from collapsing, or deviating from the circular form, which would not be the case, if the rollers were placed, on the inside, in which position they would become clogged with saw dust, and should the stave sawed become detached, (a very frequent occurrence,) they would be liable to catch it, and thus break the saw. And again rollers thus placed could not prevent the saw from springing in at the point of action, without one of them was placed opposite the cutting point, and as no roller can be put in that position on account of interfering with the stave which is being sawed it is impossible to steady it.

In operating this saw, it is made to turn on its axis with the least possible friction, and the outer rollers only touch it with sufficient force to steady it, and hold it in proper shape and position.

The carriage for bearing the wood against the saw, may rest and move on ways $y$, $y$. Such as I use is of ordinary construction, and is moved in any of the known manners most convenient, the whole being driven by any motive power, all of which will be well understood by mechanicians.

Although I prefer to place the steadying frame, and rollers, on the outside of the saw, yet they may be arranged on the inside of the same; but in this latter case, they are liable to interruption from the saw dust as before explained. My invention of applying the shaft and the steadying frame, conjointly to the long cylinder saw, enables it to perform its operation with great perfection and success.

Having thus fully described my invention and the method or methods of steadying a cylindrical saw as known previous to the date thereof, what I claim as my improvement, is—

The mode of steadying a long cylinder saw, viz, by means of a shaft and proper connections at one end of the saw, in combination with a series of friction rollers and their supporting frame, applied outside of the saw and made to bear against the curved surface of the same, and at or near its other or serrated end, substantially as hereinbefore explained.

EDWIN JENNEY.

Witnesses:
R. H. EDDY,
GARDINER G. HUBBARD.